United States Patent [19]

Einerhand et al.

[11] 4,046,588

[45] Sept. 6, 1977

[54] METHOD FOR THE MANUFACTURE OF A LEAD CHROMATE-CONTAINING PIGMENT HAVING A LOW ACID SOLUBLE LEAD CONTENT

[75] Inventors: Johan Jozef Einerhand; Gerardus Johannes Baptist Colbers, both of Maastricht; Wilhelmus Martha Andreas Huck, Elsloo; Herman Jozef Johannes Maria Geurts, Kerkrade, all of Netherlands

[73] Assignee: Hercules Incorporated, Wilmington, Del.

[21] Appl. No.: 717,414

[22] Filed: Aug. 24, 1976

Related U.S. Application Data

[63] Continuation-in-part of Ser. No. 647,953, Jan. 9, 1976, abandoned.

[30] Foreign Application Priority Data

Jan. 13, 1975 Netherlands ............... 7500365

[51] Int. Cl.$^2$ ............................................. C09C 1/20
[52] U.S. Cl. ............................... 106/298; 106/302; 106/303; 106/308 B
[58] Field of Search ............ 106/298, 302, 303, 308 B

[56] References Cited

U.S. PATENT DOCUMENTS

| 3,434,857 | 3/1969 | Seelig ........................... 106/298 |
| 3,639,133 | 2/1972 | Linton ........................... 106/298 |
| 3,682,672 | 8/1972 | Mau et al. ..................... 106/298 |
| 3,798,045 | 3/1974 | Jackson ......................... 106/298 |
| 3,871,894 | 3/1975 | Kubo et al. ................... 106/298 |

*Primary Examiner*—Winston A. Douglas
*Assistant Examiner*—J. V. Howard
*Attorney, Agent, or Firm*—Hazel L. Deming

[57] ABSTRACT

A process for the production of lead sulfochromate or lead chromate-sulfate-molybdate type pigments having a low content of acid soluble lead, good color and tinting properties and excellent resistance to industrial environments is described. The process comprises forming the desired lead chromate-containing precipitate in acidic aqueous medium containing chloride ions and a specified excess of lead ions in the absence of a pH buffering agent, coating the precipitate with a silicon and antimony compound, adjusting the pH of the medium to below 7 and recovering the coated precipitate as a pigment.

9 Claims, No Drawings

METHOD FOR THE MANUFACTURE OF A LEAD CHROMATE-CONTAINING PIGMENT HAVING A LOW ACID SOLUBLE LEAD CONTENT

This application is a continuation-in-part of copending application Ser. No. 647,953, filed Jan. 9, 1976, and now abandoned.

This invention relates to a method for the manufacture of lead sufochromate or lead chromate-sulfate-molybdate type pigments having an acid soluble lead content of less than 5% by weight calculated as PbO, good color and tinting properties and excellent resistance to industrial environments and to the pigments so produced.

The acid soluble lead content of a lead chromate-containing pigment, as used herein, refers to the description and analytical method set forth in the "Home Office Test", as described in Statutory Rules & Orders 1926, No. 1621, concerning "Lead Paints" as standardized in the Lead Paint (protection against poisoning) Act, 1926. See also, British Standard 282,389, 1963, Appendix J. and British Standard 3900, Part B 3, 1965.

Pure lead chromate ($PbCrO_4$) pigments having a low acid soluble lead content are well known and are conventionally manufactured by adding an aqueous solution of lead ions to an aqueous solution of chromate ions in such a quantity that an excess of chromate ions is maintained in the reaction medium during precipitation. Lead chromate-containing pigments which are mixed crystals of lead chromate and lead sulfate or lead chromate, lead sulfate and lead molybdate, however, cannot be manufactured in the presence of excess chromate ions and require the presence of an excess of lead ions to assure formation of the coprecipitate and to guarantee a regular crystal growth of the particles. Careful control of the acidity of the reaction medium is also required to minimize the solubility of the lead chromate-containing precipitate. Usually, lead sufochromate and lead chromate-sulfate-molybdate type pigments having a relatively low acid soluble lead content are manufactured by carrying out the precipitation in a reaction medium containing chloride ions and a pH buffering material such as sodium carbonate to maintain the pH of the reaction medium within the desired range. Pigments which have an acid soluble lead content less than 5%, however, have not been obtained by carrying out the precipitation in the presence of buffering agents.

It is also customary in the manufacture of lead chromate-containing pigments to treat the precipitate with one or more metal compounds which alone or in combination are known to improve the colorfastness and weather stability of lead chromate pigments. Typical of such after-treating compounds are titanyl sulfates, sodium silicates and antimony trifluoride and combinations thereof provide a high degree of color purity and outstanding resistance to light, weather and industrial environments. Lead chromate-containing precipitates which have been formed in the presence of a buffer and which have been after-treated with silicon and antimony compounds conventionally, however, do not give pigments having an acid soluble lead content less than 5%.

Now, in accordance with the process of this invention, it has been found that not only can lead sulfochromate and lead chromate-sulfate-molybdate type pigments of high purity, excellent color and tint strength, and superior resistance to industrial environments be obtained, but that such pigments additionally have a content of acid soluble lead which is well below the Great Britain statutory requirement of less than 5%. Accordingly, the present invention relates to a process for producing a lead chromate-containing pigment having an acid soluble lead content expressed as PbO of less than 5% by weight of the pigment and comprising mixed crystals of lead chromate and lead sulfate or lead chromate, lead sulfate and lead molybdate, said process comprising forming an aqueous suspension of a lead chromate-containing precipitate by contacting under acid conditions in the presence of chloride ions and in the absence of a buffering agent an aqueous chrome solution containing chromate and sulfate ions or chromate, sulfate and molybdate ions with an aqueous solution containing sufficient lead ions to provide an excess of 0.01 to 0.10 mole of lead ions per mole of chromate and sulfate ions or chromate, sulfate and molybdate ions present in said chrome solution, adding to the suspension a coating amount of a silicon compound and a trivalent antimony compound and precipitating said compounds as a surface coating on said precipitate, adjusting the pH of the resulting suspension to below 7, and recovering the coated precipitate as a pigment, and to the pigments so produced.

The lead chromate-containing pigments of this invention are of the mixed crystal type and include the $PbCrO_4.PbSO_4$ mixed crystals known as the lead sulfochromates and the light chrome yellows (Color Index, 3rd Ed. 1971, Pigment Yellow 34, Ref. No. 77603) and $PbCrO_4.PbMoO_4.PbSO_4$ mixed crystals known as the lead chromate-sulfate-molybdates and the molybdate oranges and reds (Color Index 3rd Ed., 1971, Pigment Red 104, Ref. No. 77605) as well as combinations of the chrome yellows with iron blues to give chrome greens or with the phthalocyanine blues to give the phthalocyanine chrome greens. Preferably, the lead sulfochromate pigments contain from about 17 to about 32.5%, and most preferably from about 20 to about 25%, of lead sulfate based on the total weight of lead chromate and lead sulfate in the mixed crystal, and the lead chromate-sulfate-molybdate pigments contain less than about 3% and most preferably, from about 1 to about 2% of lead sulfate based on the total weight of the lead chromate-sulfate-molybdate mixed crystal.

The lead sulfochromate type pigments of this invention are usually prepared by starting with a solution of a lead salt, e.g., lead nitrate, to which a solution of chromate ions and sulfate ions are added. It is also possible to use for the precipitation a dichromate ions-containing solution, in which case an alkali hydroxide is added to the solution, to convert the dichromate ion into the chromate ion. Preferably, a combined chromate and sulfate ions-containing solution is used. In the case of the molybdate type pigments, a coprecipitation method is usually employed wherein a solution of lead ions and a solution of chromate, molybdate and sulfate ions are simultaneously added to water containing a small, but sufficient, amount of lead ions to maintain the desired excess of lead ions during the coprecipitation. Regardless of the manner of addition of the individual components, it has been found necessary to the attainment of the advantages of this invention to provide during the precipitation reaction an excess of 0.01 to 0.10 mole, and preferably 0.015 to 0.060 mole of lead ions per mole of chromate and sulfate ions or chromate, sulfate and molybdate ions present in the reaction medium. Further, to assure completeness of precipitation the reaction medium should be acidic, the pH usually ranging from about 2 to about 6, and more particularly, about 5 to about 6, for the lead chromate-lead sulfate precipitation, and about 2 to about 4 for the lead chromate-lead sulfate-lead molybdate precipitation. Buffering type materials, however, should not be present during precipitation if the advantages of this invention are to be realized.

The precipitation is also usually carried out in the presence of chloride ions or chloride and aluminum ions to assure formation of the desirable crystalline form of the mixed crystal. Lead chromate-lead sulfate type precipitates are preferably formed in the presence of both chloride and aluminum ions, the quantity of chloride, when sodium chloride is used, ranging from about 200–800 mg. and preferably about 300 to 500 mg./liter of reaction medium (after precipitation) and the quantity of aluminum, expressed as $Al_2O_3$, ranging from about 0.5 to about 2%, and most preferably being about 1% by weight of the end product. On the other hand, molybdate-containing precipitates are usually formed in the presence of chloride ions only and the quantity, when sodium chloride is used, will usually range from about 100 to about 240, and preferably about 120 to about 150 mg./liter of reaction medium (after precipitation).

The time and the temperature during precipitation will vary depending upon the composition of the particular precipitate and hence are important to the attainment of a regular crystal structure. Thus, directly, the conditions under which the reactions are carried out can influence the final properties of the pigment. The optimum temperatures and times for a given pigment composition are known and are useful herein. Preferably, for the lead sulfochromates the time will range from 30 –120 minutes at 20°–70° C., and most preferably, 35°–70° C., whereas for the molybdates the time will usually range from 30 to about 60 minutes at 15° to 35° C., and most preferably, will be about 20° C.

Following precipitation, any of the well-known compounds of metals or combinations of metals such as, e.g., aluminum, silicon, antimony, cerium, tin, titanium, zirconium, and the like, which can be precipitated as coatings on the lead chromate-containing particles, can be applied as aftertreatments to improve the light- and heat-resistance and resistance to atmospheric influences of the lead chromate-containing precipitates. Aftertreatments with a silicon compound and/or trivalent antimony compound are particularly preferred and provide lead chromate-containing pigments having superior resistance to light, weather and industrial environments. Usually, the total amount of such aftertreatment compounds used will range from about 3 to about 20%, and preferably from 5 to 15%, by weight of the final pigment. Most preferably, the aftertreatment will provide from about 3 to about 8% of silicon calculated as $SiO_2$ and from about 2 to about 7% of antimony calculated as $Sb_2O_5$ by weight of the final pigment.

The lead sulfochromate and the lead chromate-sulfate molybdate pigments which are produced in accordance with this invention in the absence of a pH buffering material and which have an acid soluble lead content of less than 5% possess tint strengths which are qualitatively equal to those of the pigments formed with a buffering material. Further, the lead chromate-containing pigments produced in accordance with this invention do not exhibit the change in color tint which usually occurs when the commercially available lead sulfochromate or lead chromate-sulfate-molybdate type pigments having a low content of acid soluble lead are compounded in paints and drawn down. In fact, the color and tinting properties of the pigments of this invention are equal to those of the normal, higher lead versions of the same pigment.

The invention is illustrated by the following examples in which all parts are given as parts by weight. In the examples the procedure was carried out as a single production step for reasons of economy. The exact procedure, however, is not meant to exclude other steps such as, for example, washing salt-free, e.g., by means of decantation before adding the aftertreatment materials to improve the heat and light-fastness, or like combination of steps. In the examples the content of soluble lead in the pigment was determined according to the method as described in Appendix J. of British Standard 282,389 – 1963 and resistance to atmospheric influences was determined according to DIN 50018.

EXAMPLE 1

To a reaction vessel containing a solution of 190 parts of lead nitrate in 2400 parts of water at 50° C. was added with stirring over a period of 90 minutes a solution of 61.7 parts of sodium dichromate ($Na_2Cr_2O_7.2H_2O$), 20.9 parts of anhydrous sodium sulfate, 15.0 parts of sodium hydroxide, 11.0 parts of sodium chloride and 3.8 parts of sodium aluminate ($NaAlO_2$) in 370 parts of water at 50° C. The resulting suspension had a pH of about 5.3 and contained an excess of 0.02 mole of lead ions per mole of chromate and sulfate ions. Next, a solution of 4.3 parts of sulfuric acid, 5.0 parts of anhydrous sodium sulfate and 6.7 parts of titanyl sulfate (containing 10 g. Ti$O_2$/100 cm$^3$) were added to the suspension over a period of 15 minutes, following which time the pH of the resulting slurry was adjusted to about 6. Next a solution of 23.2 parts of neutral waterglass in 120 parts of water was added, and then a solution of 6.6 parts of anhydrous antimony trifluoride in 120 parts of water was added, and the pH was adjusted to 6.5. The precipitate was then isolated by filtering, was washed free of soluble salts and was dried at 80°–90° C. The product was 196.9 parts of a lead sulfochromate pigment having an acid soluble lead content, expressed as PbO, of 1%. The tint color and strength properties of the pigment were exceptionally good and the resistance of the pigment to light and industrial atmospheres was good.

COMPARATIVE EXAMPLE A

To a reaction vessel containing 203 parts of lead nitrate dissolved in 2400 parts of water were added 4.5 parts of anhydrous sodium carbonate dissolved in 45 parts of water and the temperature of the mixture was brought to 50° C. A solution of 61.7 parts of sodium dichromate ($Na_2Cr_2O_7$. $2H_2O$), 20.9 parts of anhydrous sodium sulfate, 15 parts of sodium hydroxide, 11.0 parts of sodium chloride and 3.8 parts of sodium aluminate in 370 parts of water at 50° C. was added to the vessel with agitation. To the resulting suspension was added over 15 minutes a solution of 4.3 parts of sulfuric acid (66°Be), 5.0 parts of anhydrous sodium sulfate and 6.7 parts of titanyl sulfate (containing 10 g. of TiO$_2$/100 cm$^3$). The pH of the resulting suspension was adjusted to 6.0 and a solution of 23.2 parts of neutral waterglass in 120 parts of water and then a solution of 6.6 parts of anhydrous antimony trifluoride in 120 parts of water were added and the pH was adjusted to about 6.5. The precipitate was isolated by filtering, was washed free of soluble salts and was dried at 80°-90° C. The product was 208.4 parts of a lead sulfochromate-containing pigment which had a soluble lead content, expressed as PbO, of 8.5%. The fastness of the pigment to industrial atmospheres was limited.

COMPARATIVE EXAMPLE B

The procedure of Example 1 was repeated except that in this comparative example no titanyl sulfate, waterglass or antimony trifluoride were used and following formation of the precipitate a solution of 4.3 parts of sulfuric acid and 5.0 parts of sodium sulfate were added to the suspension over 15 minutes and the precipitate was filtered, washed and dried (80°-90° C.). The product was a lead sulfochromate pigment (165.1 parts) having an acid soluble lead content, expressed as PbO, of about 5%, which amount does not meet the Great Britain statutory prescribed requirement of less than 5%. The lightfastness and the resistance of the pigment to industrial atmospheres was poor.

COMPARATIVE EXAMPLE C

The procedure of Example 1 was repeated except that the precipitation step was carried out in the absence of sodium chloride and sodium aluminate and the amount of sodium hydroxide was increased from 15.0 parts to 16.5 parts. The product was 195 parts of a lead sulfochromate pigment having a very dirty appearance and an acid soluble lead content, expressed as PbO, of 6.4%.

EXAMPLE 2

To a reaction vessel containing 2900 parts of water and 6.25 parts of sodium chloride at 20° C. were added 77 parts of a lead nitrate solution having a specific gravity of 1.28 and containing about 215 g. Pb/liter. To the vessel were simultaneously added with stirring an acidified solution of 180.6 parts of lead nitrate in 1125 parts of water and a solution of 71.7 parts of sodium dichromate ($Na_2Cr_2O_7.2H_2O$), 19.2 parts of sodium molybdate ($Na_2MoO_4.2H_2O$), 1.8 parts of anhydrous sodium sulfate and 22 parts sodium hydroxide in 1125 parts of water. The resulting suspension had a pH of about 3 and contained an excess of 0.056 mole of lead ions per mole of chromate, sulfate and molybdate ions. Next a solution of 45.5 parts of neutral waterglass in 65 parts of water followed by a solution of 23.3 parts of aluminum sulfate ($Na_2(SO_4)_3.18H_2O$) in 160 parts of water and a solution of 17.6 parts of anhydrous antimony fluoride in 120 parts of water were added to the resulting slurry and the pH was adjusted to about 6.5. The product was then isolated by filtering, washing and drying at 80°-90° C. The product of this example was 219 parts of a molybdate red pigment having an acid soluble lead content, expressed as PbO, of 2%. The color and tint properties were good and the resistance of the pigment to light and industrial atmospheres was excellent.

COMPARATIVE EXAMPLE D

The procedure of Example 2 was repeated except that the acidified solution of lead nitrate contained 193.5 parts of lead nitrate and 11.25 parts of nitric acid (55%) in 1125 parts of water and the solution of dichromate contained 71.3 parts sodium dichromate ($Na_2Cr_2O_7.2H_2O$), 16.8 parts of sodium molybdate ($Na_2MoO_4.2H_2O$), 4.75 parts of anhydrous sodium sulfate and 19.1 parts of sodium hydroxide in 1125 parts of water. The excess of lead ions present in the suspension during precipitation was 0.13 mole per mole of chromate, sulfate and molybdate ions, and the isolated product was 232 parts of a molybdate red pigment having an acid soluble lead content, expressed as PbO, of about 6%.

EXAMPLE 3

The procedure of Example 1 was repeated except that a solution of 5.2 parts of antimony oxide in 18.6 parts of 30% hydrochloric acid was substituted for the solution of 6.6 parts of antimony trifluoride in 120 parts of water. The product was 196.9 parts of a lead sulfochromate pigment having an acid soluble lead content, expressed as PbO, of 1.9%. The resistance of the pigment to industrial atmospheres was good and the other properties were similar to the pigment of Example 1.

What we claim and desire to protect by Letters Patent is:

1. A process for producing a lead chromate-containing pigment having an acid soluble lead content expressed as PbO of less than 5% by weight of the pigment and consisting essentially of mixed crystals of lead chromate and lead sulfate, said process comprising: forming an aqueous suspension of a lead chromate-lead sulfate precipitate by contacting under acid conditions in the presence of chloride and aluminum ions and in the absence of a buffering agent an aqueous chrome solution containing chromate and sulfate ions with an aqueous solution containing sufficient lead ions to provide an excess of 0.01 to 0.10 mole of lead ions per mole of chromate and sulfate ions present in said chrome solution; adding to the suspension a coating amount of a silicon compound and a trivalent antimony compound and precipitating said compounds as a surface coating on said precipitate; adjusting the pH of the resulting suspension to below 7; and recovering the coated precipitate as a pigment.

2. The process of claim 1 wherein the contacting is carried out at a pH of about 5 to about 6 and at a temperature of about 35°-70° C. for at least 30 minutes.

3. The process of claim 2 wherein the mixed crystals contain from 17 to 32.5% of lead sulfate.

4. The process of claim 3 wherein the excess of lead ions is 0.015 to 0.06 mole per mole of chromate and sulfate ions.

5. A process for producing a lead chromate-containing pigment having an acid soluble lead content expressed as PbO of less than 5% by weight of the pigment and consisting essentially of mixed crystals of lead chromate, lead molybdate and from 1 to 3% of lead sulfate, said process comprising: forming an aqueous suspension of a coprecipitate of lead chromate, lead molybdate and from 1 to 3% of lead sulfate by contacting under acid conditions in the presence of chloride ions and in the absence of a buffering agent an aqueous chrome solution containing chromate, molybdate and sulfate ions with an aqueous solution containing sufficient lead ions to provide an excess of 0.01 to 0.10 mole of lead ions per mole of chromate, molybdate and sulfate ions during the coprecipitation; adding to the suspension a coating amount of a silicon compound and a trivalent antimony compound and precipitating said compounds as a surface coating on said coprecipitate; adjusting the pH of the resulting suspension to below 7; and recovering the coated coprecipitate as a pigment.

6. The process of claim 5 wherein the coprecipitation is carried out at a pH of about 2 to about 4 and at a temperature of 15° to 35° C. for at least 30 minutes.

7. The process of claim 6 wherein the excess of lead ions is 0.015 to 0.060 mole per mole of chromate, molybdate and sulfate ions.

8. The lead chromate-containing pigment produced according to the process of claim 7.

9. The lead chromate-containing pigment produced according to the process of claim 1.

* * * * *